US010704477B2

(12) United States Patent
Pursifull et al.

(10) Patent No.: US 10,704,477 B2
(45) Date of Patent: Jul. 7, 2020

(54) METHOD FOR CRANKCASE VENTILATION IN A BOOSTED ENGINE

(71) Applicant: Ford Global Technologies, LLC, Dearborn, MI (US)

(72) Inventors: Ross Dykstra Pursifull, Dearborn, MI (US); Mark Steadman, Bromley (GB); Katherine Jane Brewer, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 16/048,716

(22) Filed: Jul. 30, 2018

(65) Prior Publication Data

US 2018/0334974 A1 Nov. 22, 2018

Related U.S. Application Data

(62) Division of application No. 14/792,124, filed on Jul. 6, 2015, now Pat. No. 10,100,757.

(51) Int. Cl.
*F02D 41/00* (2006.01)
*F02M 25/06* (2016.01)
(Continued)

(52) U.S. Cl.
CPC ....... *F02D 41/0025* (2013.01); *F01M 13/023* (2013.01); *F01M 13/04* (2013.01); *F02B 37/164* (2013.01); *F02D 41/0007* (2013.01); *F02M 25/06* (2013.01); *F02M 25/089* (2013.01); *F02M 25/0836* (2013.01); *F02M 35/10222* (2013.01); *F01M 2013/0044* (2013.01); *F01M 2013/026* (2013.01); *F01M 2013/027* (2013.01);
(Continued)

(58) Field of Classification Search
CPC . F02D 41/0025; F02D 2250/08; F02M 25/06; F02M 25/0836; F02M 25/089; F02M 2013/026; F02M 2013/027
USPC .................................. 701/103; 123/572–574
See application file for complete search history.

(56) References Cited

U.S. PATENT DOCUMENTS 3,372,685 A * 3/1968 Bestland ................ F01M 13/00
123/198 R
3,949,719 A 4/1976 Bellanca et al.
(Continued)

FOREIGN PATENT DOCUMENTS

CN 102733886 A 10/2012
CN 103906901 A 7/2014
(Continued)

OTHER PUBLICATIONS

National Intellectual Property Administration of the People's Republic of China, Office Action and Search Report Issued in Application No. 201610531667.3, dated Aug. 1, 2019, 9 pages. (Submitted with Partial Translation).

*Primary Examiner* — Mahmoud Gimie
(74) *Attorney, Agent, or Firm* — Geoffrey Brumbaugh; McCoy Russell LLP (57) ABSTRACT

Methods and systems are provided for enhancing crankcase ventilation in a boosted engine. During boosted conditions, a crankcase may be ventilated via vacuum generated at an aspirator coupled in a compressor bypass passage. However, when the aspirator is plugged, pressure in the crankcase may be relieved by flowing crankcase gases through an aspirator bypass passage.

13 Claims, 6 Drawing Sheets

(51) Int. Cl.
*F02M 35/10* (2006.01)
*F02B 37/16* (2006.01)
*F02M 25/08* (2006.01)
*F01M 13/02* (2006.01)
*F01M 13/04* (2006.01)
*F01M 13/00* (2006.01)

(52) U.S. Cl.
CPC .. *F02D 2200/0406* (2013.01); *F02D 2250/08* (2013.01); *Y02T 10/144* (2013.01)

(56) References Cited

U.S. PATENT DOCUMENTS

| | | | |
|---|---|---|---|
| 4,318,374 | A | 3/1982 | Yasuhara |
| 4,901,703 | A | 2/1990 | Humphries |
| 5,005,550 | A | 4/1991 | Bugin, Jr. et al. |
| 5,349,935 | A | 9/1994 | Mezger et al. |
| 5,499,616 | A | 3/1996 | Enright |
| 5,592,923 | A | 1/1997 | Machida |
| 5,629,477 | A | 5/1997 | Ito |
| 6,047,670 | A | 4/2000 | Stella et al. |
| 6,052,644 | A | 4/2000 | Murakami et al. |
| 6,196,206 | B1 | 3/2001 | Bedkowski |
| 6,354,283 | B1 | 3/2002 | Hawkins et al. |
| 6,688,104 | B2 | 2/2004 | Baeuerle et al. |
| 6,712,049 | B2 | 3/2004 | Kawano |
| 6,779,388 | B2 | 8/2004 | Baeuerle et al. |
| 6,804,995 | B2 | 10/2004 | Kawano |
| 6,832,147 | B2 | 12/2004 | Vornehm et al. |
| 6,910,467 | B2 | 6/2005 | Murakami et al. |
| 7,007,682 | B2 | 3/2006 | Takahashi et al. |
| 7,011,690 | B2 | 3/2006 | Altvater et al. |
| 7,212,905 | B2 | 5/2007 | Grill |
| 7,275,527 | B2 | 10/2007 | Bruchner et al. |
| 7,316,223 | B2 | 1/2008 | Wakahara |
| 7,523,748 | B2 | 4/2009 | Hirano et al. |
| 7,743,752 | B2 | 6/2010 | Kerns et al. |
| 7,816,475 | B2 | 10/2010 | Yamamoto et al. |
| 7,886,727 | B2 | 2/2011 | Ulrey et al. |
| 8,109,259 | B2 | 2/2012 | Ulrey et al. |
| 8,122,870 | B2 | 2/2012 | Konohara |
| 8,312,756 | B2 | 11/2012 | Swinford |
| 8,826,659 | B2 | 9/2014 | Shieh |
| 9,027,536 | B2 | 5/2015 | Pursifull et al. |
| 9,228,557 | B1 | 1/2016 | Pursifull |
| 9,359,923 | B2 | 6/2016 | Pursifull et al. |
| 9,611,816 | B2 | 4/2017 | Pursifull et al. |
| 9,651,003 | B2 | 5/2017 | Ulrey et al. |
| 9,835,115 | B2 | 12/2017 | Pursifull et al. |
| 2002/0033157 | A1 | 3/2002 | Thompson et al. |
| 2003/0183212 | A1 | 10/2003 | Gottemoller et al. |
| 2005/0015196 | A1 | 1/2005 | Hawkins |
| 2006/0011163 | A1 | 1/2006 | Watanabe et al. |
| 2007/0199550 | A1* | 8/2007 | Lindmark ............ F02M 25/06 123/572 |
| 2008/0173284 | A1 | 7/2008 | Kavanagh et al. |
| 2008/0208432 | A1 | 8/2008 | Hu |
| 2009/0090337 | A1 | 4/2009 | Asanuma et al. |
| 2009/0308364 | A1* | 12/2009 | Konohara ........... F01M 13/022 123/572 |
| 2009/0320809 | A1 | 12/2009 | Ruppel et al. |
| 2010/0147270 | A1 | 6/2010 | Pursifull et al. |
| 2012/0247438 | A1 | 10/2012 | Konohara |
| 2013/0025564 | A1 | 1/2013 | Setiadi |
| 2014/0016399 | A1 | 1/2014 | Lu et al. |
| 2014/0081549 | A1 | 3/2014 | Rollinger et al. |
| 2014/0081550 | A1 | 3/2014 | Jentz et al. |
| 2014/0116399 | A1* | 5/2014 | Ulrey .................... F02M 25/08 123/520 |
| 2014/0138562 | A1 | 5/2014 | Rollinger et al. |
| 2014/0140821 | A1 | 5/2014 | Pursifull |
| 2014/0224232 | A1 | 8/2014 | Hotta |
| 2014/0318514 | A1 | 10/2014 | Pursifull |
| 2014/0352673 | A1* | 12/2014 | Ikeda .................... F01M 11/10 123/572 |
| 2015/0053188 | A1* | 2/2015 | Kuribayashi ......... F02B 37/183 123/574 |
| 2015/0114348 | A1 | 4/2015 | Pursifull et al. |

FOREIGN PATENT DOCUMENTS

| | | |
|---|---|---|
| CN | 104121087 A | 10/2014 |
| EP | 1959117 A1 | 8/2008 |
| EP | 2182185 A1 | 5/2010 |
| JP | WO2013065112 A1 | 5/2013 |
| WO | 2013073010 A1 | 5/2013 |
| WO | 2014060831 A2 | 4/2014 |

* cited by examiner

METHOD FOR CRANKCASE VENTILATION IN A BOOSTED ENGINE

CROSS REFERENCE TO RELATED APPLICATION

The present application is a divisional of U.S. patent application Ser. No. 14/792,124, entitled "METHOD FOR CRANKCASE VENTILATION IN A BOOSTED ENGINE," filed on Jul. 6, 2015. The entire contents of the above-referenced application are hereby incorporated by reference in its entirety for all purposes.

FIELD

The present description relates generally to methods and systems for ventilating a crankcase of a boosted engine.

BACKGROUND/SUMMARY

Unburned fuel and other combustion products may escape past the piston of an internal combustion engine (e.g., an internal combustion engine of a vehicle) into the crankcase. The resulting gases in the crankcase, often referred to as "blow-by" gases, may contribute to the formation of sludge in the engine oil supply. Further, blow-by gases may excessively pressurize the crankcase, resulting in undesirable leakage of oil pan gasket and crankcase seals. To avoid these issues, an engine may include a crankcase ventilation (CV) system coupled to the intake, which serves to vent blow-by gases from the crankcase to the intake. The CV system may include a passive crankcase ventilation (CV) valve intermediate the crankcase and the engine intake passage, to regulate the flow of blow-by gases from the crankcase to the intake manifold.

One example approach to purging a crankcase in a turbocharged engine is shown by Ulrey et al. in U.S. 2014/0116399. Therein, vapors from the crankcase are drawn into a suction port of an aspirator as the aspirator generates vacuum via compressor bypass flow during boosted conditions. During conditions when the engine is not boosted, vapors from the crankcase are directed to the intake manifold.

The inventors herein have recognized a potential issue with the example approach in U.S. 2014/0116399. As an example, the crankcase may still be over-pressurized (e.g., with a higher amount of positive pressure) during boosted conditions when the aspirator is clogged. For example, crankcase vapors that flow through the aspirator may cause a higher level of humidity in the aspirator. During cooler ambient conditions, the aspirator may be susceptible to frost formation and resulting aspirator blockage at a throat of the aspirator. Accordingly, vapors in the crankcase may not be evacuated during subsequent boosted conditions leading to a higher than desirable positive pressure in the crankcase. This increased pressure in the crankcase may degrade the crankcase seals causing leaks and eventual degradation of engine performance and durability.

The inventors herein have identified approaches to at least partially address the above issues. An example approach includes a method for a boosted engine comprising, during a first condition, generating vacuum at an aspirator positioned in a compressor bypass passage, using the vacuum to draw gases from a crankcase, and reducing a pressure in the crankcase, and during a second condition, reducing the pressure in the crankcase via a bypass passage coupled to an intake passage and crankcase. In this way, crankcase vapors may be evacuated via the bypass passage reducing a likelihood of crankcase pressurization.

As one example, a boosted engine may include a compressor with an aspirator arranged across the compressor in a compressor bypass passage. A suction port of the aspirator may be fluidically coupled with a crankcase of the boosted engine. The aspirator may generate vacuum during boosted engine operation via flow of compressed air in the compressor bypass passage, the compressed air flowing from an outlet of a compressor to an inlet of the compressor. Further, an aspirator bypass passage may fluidically couple the crankcase to the inlet of the compressor such that fluid flow through the aspirator bypass passage circumvents the aspirator. Thus, when the aspirator allows compressor bypass flow therethrough (e.g., with aspirator not plugged), vacuum generated at the aspirator draws crankcase vapors into the suction port of the aspirator. However, if the aspirator is blocked, crankcase vapors may then flow via the aspirator bypass passage into the inlet of the compressor.

In this way, crankcase over-pressurization may be reduced. Positive pressure in the crankcase during boosted conditions may be relieved by flowing crankcase vapors to the compressor inlet via the aspirator bypass passage if the aspirator is blocked. By reducing a likelihood of excessive pressure in the crankcase, degradation of oil seals in the crankcase may be reduced. Further still, leaks may be averted enabling an improvement in engine performance. Overall, durability of the boosted engine may be enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
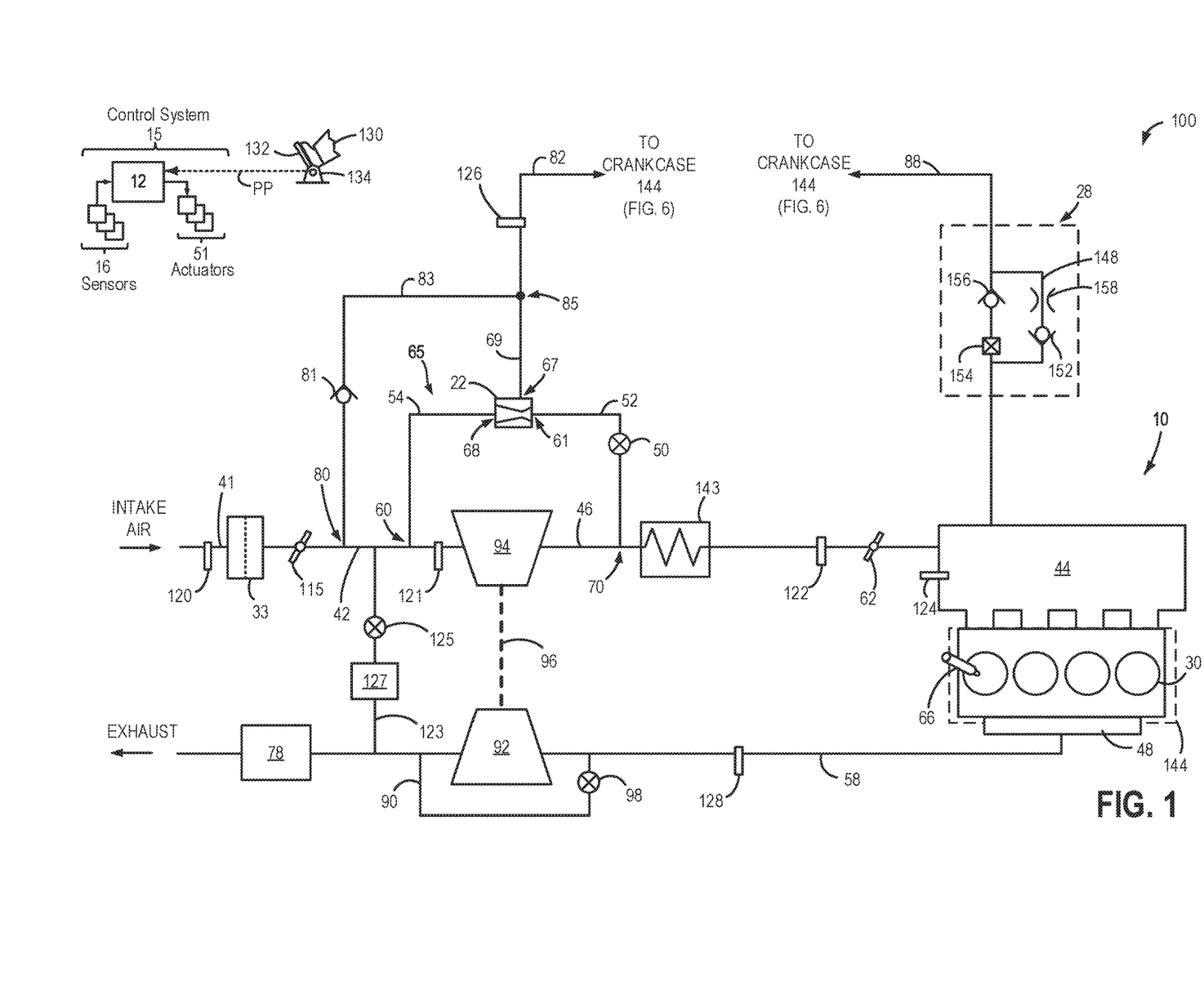
FIGS. 1 and 2 schematically show example engine systems with aspirator bypass passages, in accordance with the present disclosure.
Figure 2:
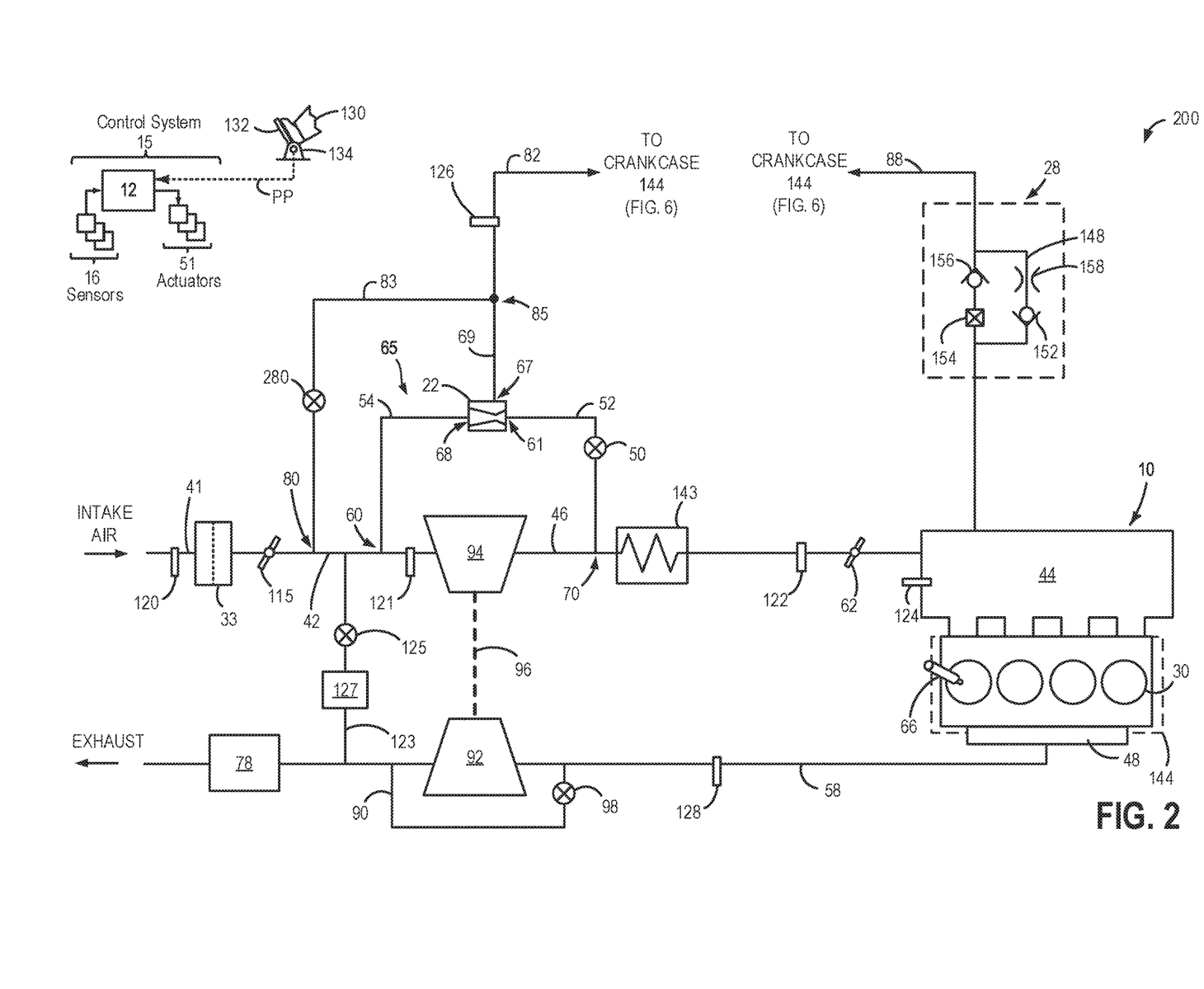
Figure 3:
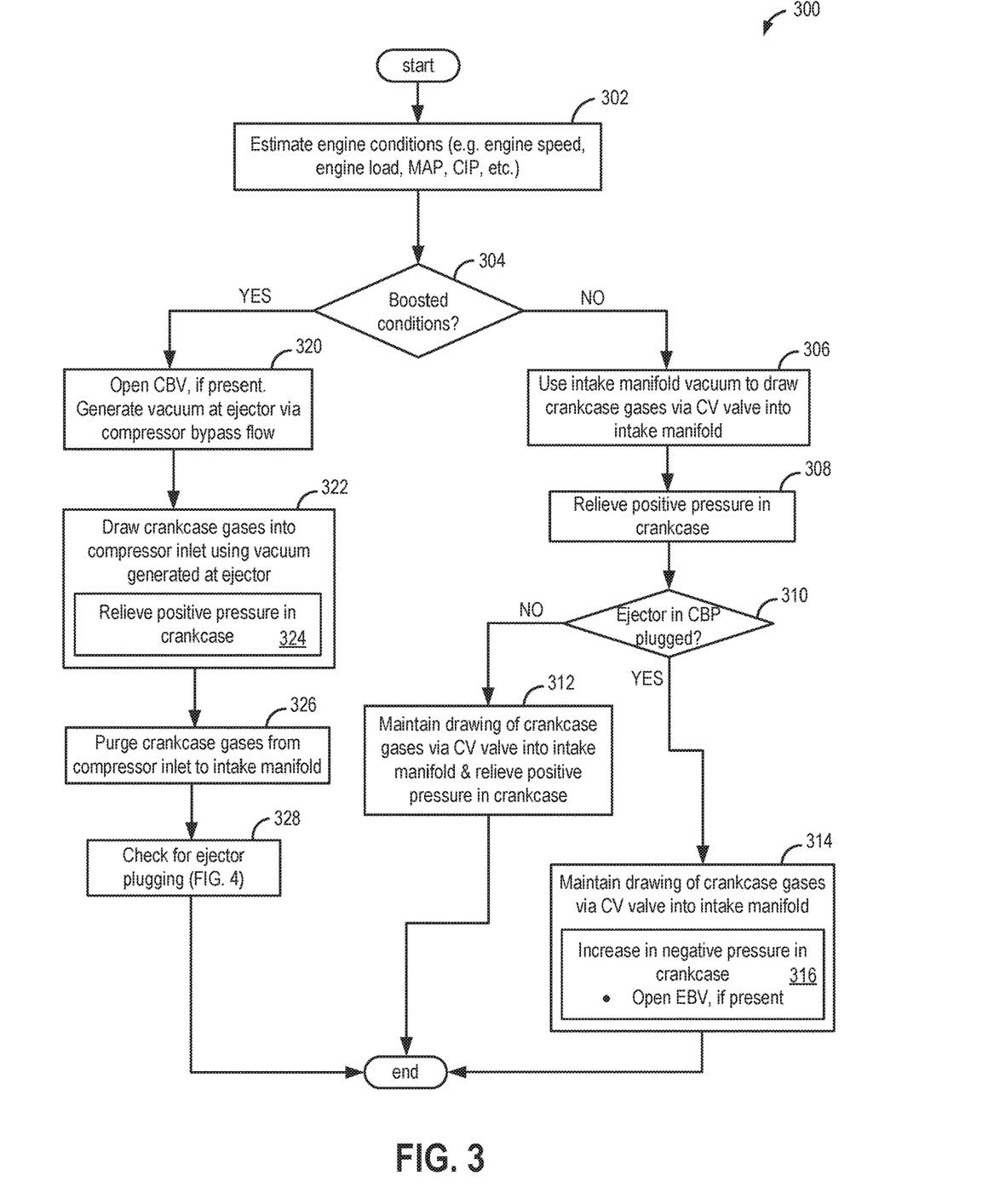
FIG. 3 depicts a high level flow chart for crankcase ventilation flow during boosted conditions and non-boosted conditions in accordance with the present disclosure.

The following description relates to systems and methods for reducing pressure in a crankcase of an engine, such as the example engine systems shown in FIGS. 1 and 2, particularly when an aspirator drawing vapors from the crankcase is degraded. The engine may be a turbocharged engine including a compressor. During boosted conditions, the crankcase of the engine may be purged of vapors by flowing the vapors to the aspirator coupled in a compressor bypass passage across from the compressor (FIG. 3). However, if the aspirator is plugged (e.g., obstructs compressor bypass flow and does not generate vacuum), vapors in the crankcase may be purged during boosted conditions via an aspirator bypass passage to relieve pressure build in the crankcase. A controller may be configured to perform a routine, such as the example routine of FIG. 4, to modify additional engine parameters in response to the aspirator being plugged. An example of crankcase ventilation is depicted in FIG. 5 for conditions when the aspirator is degraded as well as for conditions when the aspirator is robust.

Regarding terminology used throughout this detailed description, a pressure rise in the crankcase indicates an increase in positive pressure (e.g., relative to barometric pressure) unless specified. Further, the term "vacuum" is used to indicate negative pressure (e.g., relative to barometric pressure).

Referring now to FIG. 1, it shows aspects of an example engine system 100 which may be included in an automotive vehicle. The engine system is configured for combusting fuel vapor accumulated in at least one component thereof. Engine system 100 includes a multi-cylinder internal combustion engine 10 which may propel the automotive vehicle. Engine 10 may be controlled at least partially by a control system 15 including a controller 12 and by input from a vehicle operator 130 via an input device 132. In this example, input device 132 includes an accelerator pedal and a pedal position sensor 134 for generating a proportional pedal position signal PP.

Engine system 100 may receive intake air via intake passage 41. As shown at FIG. 1, intake passage 41 may include an air filter 33 (also termed air cleaner 33) and an air induction system (AIS) throttle 115. AIS throttle 115 may be optional. The position of AIS throttle 115 may be adjusted via a throttle actuator (not shown) communicatively coupled to controller 12. The AIS throttle 115 may be an optional component.

Engine 10 also includes an intake throttle 62 (also termed, engine throttle 62) arranged downstream of compressor 94 fluidically coupled to the intake manifold 44. Intake throttle 62 may include a throttle plate, and in the depicted example a position of the intake throttle 62 (specifically, a position of the throttle plate) may be varied by controller 12 via a signal provided to an electric motor or actuator included with intake throttle 62, a configuration that is commonly referred to as electronic throttle control (ETC). In this manner, engine throttle 62 may be operated to vary an amount of intake air provided to intake manifold 44 and the plurality of cylinders therein.

A barometric pressure sensor 120 may be coupled at an inlet of intake passage 41 for providing a signal regarding atmospheric or barometric pressure (BP). A compressor inlet pressure (CIP) sensor may be coupled to intake chamber 42 to provide a signal regarding pressure of air entering compressor 94. Further, a throttle inlet pressure sensor 122 (also termed TIP sensor 122) may be coupled immediately upstream of intake throttle 62 for providing a signal regarding throttle inlet pressure (TIP) or boost pressure. Further still, a manifold air pressure sensor 124 may be coupled to intake manifold 44 for providing a signal regarding manifold air pressure (MAP) to controller 12.

Intake manifold 44 is configured to supply intake air or an air-fuel mixture to a plurality of combustion chambers 30 (also termed, cylinders 30) of engine 10. Each of the plurality of cylinders 30 may include a corresponding piston reciprocating within (not shown). The combustion chambers 30 may be arranged above a lubricant-filled crankcase 144 such that reciprocating pistons of the combustion chambers rotate a crankshaft (not shown) located in the crankcase 144. Crankcase 144 in FIG. 1 is depicted with dashed lines, coupled below cylinders 30. The connecting conduits to crankcase 144 are depicted away from crankcase 144 for simplifying the description and depiction of the embodiment. Crankcase 144 is shown in more detail in FIG. 6.

Combustion chambers 30 may be supplied one or more fuels via fuel injectors 66. Fuels may include gasoline, alcohol fuel blends, diesel, biodiesel, compressed natural gas, etc. Fuel may be supplied to the combustion chambers via direct injection (as shown in FIG. 1), port injection, throttle valve-body injection, or any combination thereof. It will be noted that a single fuel injector 66 is depicted in FIG. 1 and though not shown, each combustion chamber 30 may be coupled with a respective fuel injector 66. In the combustion chambers, combustion may be initiated via spark ignition and/or compression ignition. Unburned fuel and other combustion products may escape past each piston from cylinders 30 into crankcase 144. The resulting gases in the crankcase, often referred to as "blow-by" gases, may contribute to the formation of sludge in the engine oil supply. Further, blow-by gases may excessively pressurize the crankcase 144, resulting in undesirable leakage of an oil pan gasket and crankcase seals. To reduce these issues, engine 10 may include a crankcase ventilation (CV) system, which serves to vent blow-by gases from the crankcase 144 to either intake manifold 44 or to aspirator 22. Further details of the CV system will be provided below.

Exhaust gases from combustion chambers 30 may exit engine 10 via an exhaust manifold 48 along exhaust passage 58 into an emission control device 78 coupled to the exhaust passage 58. Exhaust gas sensor 128 is shown coupled to exhaust passage 58 upstream of emission control device 78. Sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 78 is shown arranged along exhaust passage 58 downstream of exhaust gas sensor 128 and exhaust turbine 92. Device 78 may be a three way catalyst (TWC), NOx trap, various other emission control devices, or combinations thereof.

Engine 10 may further include a compression device such as a turbocharger or supercharger including at least the compressor 94 arranged in intake chamber 42. For a turbocharger, compressor 94 may be at least partially driven by an exhaust turbine 92 (e.g., via a shaft) arranged along exhaust passage 58. Compressor 94 draws air from intake passage 41 and intake chamber 42, compresses the air and supplies pressurized air to boost chamber 46. Boost chamber 46 is arranged between compressor 94 and intake throttle 62. As such, each of compressor 94 and intercooler 143 are positioned upstream of intake throttle 62. Boost chamber 46 is arranged between compressor 94 and intake throttle 62. The intercooler 143 cools the compressed air received from compressor 94, and the cooled air then flows via intake throttle 62 to intake manifold 44, depending on the position of throttle plate of intake throttle 62.

Exhaust gases exiting combustion chambers 30 and exhaust manifold 48 spin exhaust turbine 92 which is coupled to compressor 94 via shaft 96. For a supercharger, compressor 94 may be at least partially driven by the engine and/or an electric machine, and may not include an exhaust turbine. The amount of compression provided to one or more cylinders of the engine via a turbocharger or supercharger may be varied by controller 12. Boost pressure sensor 122, also termed TIP sensor 122, may be coupled to boost chamber 46 downstream of compressor 94 for providing a signal of boost pressure to controller 12.

A wastegate 98 may be coupled across exhaust turbine 92 in a turbocharger. Specifically, wastegate 98 may be included in a bypass passage 90 coupled between an inlet and outlet of the exhaust turbine 92. By adjusting a position of wastegate 98 via controller 12, an amount of boost provided by the turbocharger may be controlled.

Further, in the disclosed embodiment, a low pressure exhaust gas recirculation (LP-EGR) system may route a desired portion of exhaust gases from downstream of exhaust turbine 92 to the intake chamber 42 via LP-EGR passage 123. The amount of LP-EGR provided may be varied by controller 12 via an EGR valve 125. Further, LP-EGR gases may be cooled by traveling through LP-EGR cooler 127. By introducing exhaust gas to the engine 10, the amount of available oxygen for combustion is decreased, thereby reducing combustion flame temperatures and reducing the formation of NOx, for example. As will be noted, LP-EGR passage 123 fluidically couples exhaust passage 58 to intake chamber 42 downstream of AIS throttle 115 and upstream of compressor 94. The AIS throttle 115 may be adjusted to a more closed position to draw LP-EGR flow into intake chamber 42. By closing the AIS throttle, a vacuum may be generated in intake chamber 42 enabling a higher flow rate of LP-EGR when desired.

Ejector 22 (also termed aspirator 22) is shown coupled in compressor bypass passage 65 across from compressor 94. Compressor bypass passage 65 includes a first passage 52 and a second passage 54 with aspirator 22 fluidically coupling first passage 52 to second passage 54. First passage 52 is fluidically coupled to boost chamber 46 at location 70 downstream of compressor 94 and upstream of engine throttle 62. Thus, first passage 52 enables fluidic communication between motive inlet 61 of aspirator 22 to boost chamber 46. Likewise, second passage 54 is fluidically coupled to intake chamber 42 at location 60 upstream of compressor 94 and downstream of optional AIS throttle 115 (and downstream of air cleaner 33). Therefore, second passage 54 of compressor bypass passage 65 fluidically couples motive outlet 68 of aspirator 22 to intake chamber 42. Thus, aspirator 22 may receive pressurized air as motive flow and may discharge de-pressurized air to an inlet of compressor 94 at location 60.

It will be appreciated that alternative embodiments may include a plurality of ejectors powered by compressor pressure without departing from the scope of this disclosure. For example, an additional ejector that generates vacuum due to compressor bypass flow may aid in purging a fuel vapor storage canister included in the engine system.

Compressor bypass passage 65 may divert a portion of compressed air from downstream of compressor 94 (and upstream of intake throttle 62) to upstream of compressor 94 via aspirator 22. The portion of compressed air diverted from downstream of compressor 94 may flow into first passage 52 of compressor bypass passage 65 from location 70. This portion of compressed air may then stream through aspirator 22 and may exit into intake chamber 42 downstream of AIS throttle 115 via second passage 54 of compressor bypass passage 65.

As depicted in FIG. 1, compressed air may be diverted into compressor bypass passage 65 at location 70 which is downstream of compressor 94 and upstream of charge air cooler 143. In alternative embodiments, compressor bypass passage 65 may divert a portion of compressed air from downstream of charge air cooler 143 and upstream of intake throttle 62 to the inlet of compressor 94.

Air flow through aspirator 22 creates a low pressure region within the aspirator 22, thereby providing a vacuum source for vacuum reservoirs and vacuum consumption devices such as crankcase 144, fuel vapor canisters, brake boosters, etc. Aspirators (which may alternatively be referred to as ejectors, venturis, jet pumps, and eductors) are, therefore, passive vacuum generating devices which can provide low-cost vacuum generation when utilized in engine systems. The amount of vacuum generated by aspirator 22 may be dependent on a motive air flow rate through aspirator 22. The motive flow rate through aspirator 22 may depend on a size of the aspirator 22, boost pressure in boost chamber 46 as well as compressor inlet pressure (CIP) in intake chamber 42. As such, CIP may be dependent on a position of AIS throttle 115. Thus, the amount of air diverted through the compressor bypass passage may depend upon relative pressures within the engine system.

In the depicted embodiment of FIG. 1, compressor bypass passage 65 also includes compressor bypass valve (CBV) 50 to regulate the flow of compressed air along compressor bypass passage 65. CBV 50 may be an optional valve. As such, by opening CBV 50 and diverting compressed air into compressor bypass passage 65, boost chamber 46 (between compressor 94 and intake throttle 62) may be depressurized during a rapid transition from a higher engine air flow rate to a lower engine air flow rate, such as during a tip-out condition.

CBV 50 may be an electronically controlled valve and may be actuated by controller 12 based on engine conditions. However, as an alternative, CBV 50 may be a pneumatic (e.g., vacuum-actuated) valve. Whether CBV 50 is actuated electrically or with vacuum, it may be either a binary valve (e.g., a two-way valve) or a continuously variable valve. Binary valves may be controlled either fully open or fully closed (e.g., fully shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. As an example, continuously variable valves may be fully open, fully closed, or at any position therebetween. Embodiments with a continuously variable CBV may provide greater flexibility in control of the motive flow through ejector 22, with the drawback that continuously variable valves may be much more costly than binary valves. In other examples, CBV 50 may be a gate valve, pivoting plate valve, poppet valve, or another suitable type of valve. The state of CBV 50 may be adjusted based on various engine operating conditions, to vary the motive flow through ejector 22. It will be noted that CBV 50 may not be included in alternative embodiments without departing from the scope of the present disclosure.

Figure 6:
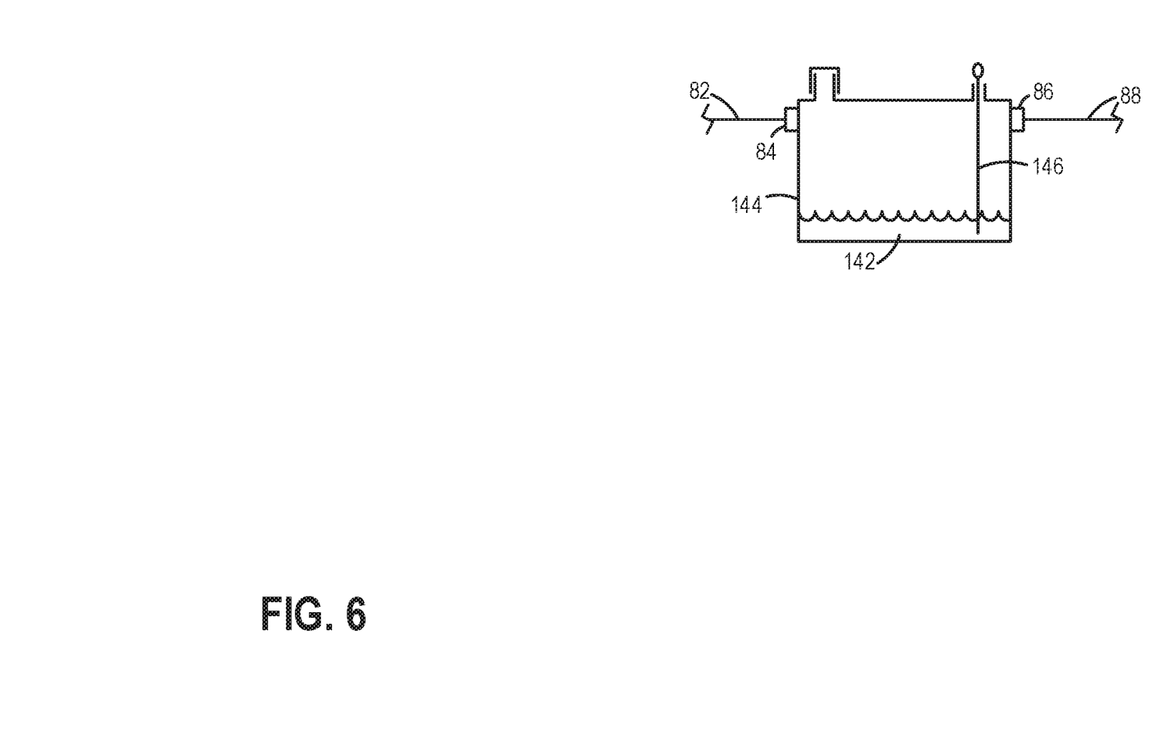
FIG. 6 schematically shows an example crankcase included in the example engine systems of FIGS. 1 and 2.

In the depicted embodiment, a suction port 67 of aspirator 22 is fluidically coupled to crankcase 144 via suction conduit 69 and conduit 82. Conduit 82 and suction conduit 69 may together be termed a suction path. Specifically, oil separator 84 of crankcase 144 (as shown in FIG. 6) is fluidically coupled to aspirator 22 via conduit 82 and suction conduit 69. Oil separator 84 may be termed a second port of crankcase 144. Oil particles present in blow-by gases (also termed, crankcase vapors) in crankcase 144 may be selectively filtered via each of oil separators 84 and 86 (shown in FIG. 6) as these crankcase vapors exit the crankcase. Sensor 126 coupled in conduit 82 provides a signal of crankcase pressure to controller 12. While sensor 126 is shown coupled along conduit 82, other embodiments may place sensor 126 at other locations for sensing crankcase pressure. As depicted in FIGS. 1 and 6, oil separator 84 of crankcase 144 is also coupled fluidically to intake chamber 42 via aspirator bypass passage 83 (also termed, ejector bypass passage 83). To elaborate, suction conduit 69 and ejector bypass passage 83 merge into conduit 82 at junction 85. Thus, conduit 82 splits into aspirator bypass passage 83 and suction conduit 69 at junction 85.

Ejector bypass passage 83 bypasses ejector 22 enabling fluid flow between crankcase 144 and intake chamber 42 to bypass ejector 22. As will be described later, aspirator bypass passage 83 may provide an alternative ventilation path for crankcase gases if ejector 22 is degraded. Check valve 81 is coupled in aspirator bypass passage 83 to enable fluid flow from junction 85 to intake chamber 42 and block fluid flow (e.g., not allow fluid flow) from intake chamber 42 towards junction 85.

As shown in FIG. 6, crankcase 144 includes lubricating oil 142 and a dipstick 146 for measuring a level of oil 142 within crankcase 144. As shown in FIG. 1, crankcase 144 fluidically communicates with intake manifold 44 via crankcase ventilation tube 88 which includes crankcase ventilation (CV) valve 28 coupled therein. Crankcase 144 is also fluidically coupled to intake chamber 42, as described earlier, via conduit 82. Thus, the CV system may include CV valve 28 intermediate the crankcase 144 and the intake manifold 44, to regulate the flow of blow-by gases from the crankcase to the intake manifold. As such, crankcase ventilation may occur along crankcase ventilation tube 88 (also termed crankcase ventilation path 88) and CV valve 28 during engine conditions when pressure in intake manifold 44 is lower than barometric pressure (or lower than CIP). Specifically, vapors from crankcase 144 may exit crankcase 144 via oil separator 86 (termed first port of crankcase herein, shown in FIG. 6) into crankcase ventilation tube 88, and thereon through CV valve 28 (e.g., via check valve 156 and valve 154) into intake manifold 44.

CV valve 28 is schematically illustrated as a passive valve switching between a reverse flow path 148 including reverse flow orifice 158 and a forward flow path including a pneumatically-controlled valve 154. Crankcase ventilation (CV) flow along the forward flow path through valve 154 may largely occur during conditions when pressure in intake manifold 44 is lower than CIP. CV flow along the forward flow path includes flow of crankcase gases from crankcase 144 towards intake manifold 44 via crankcase ventilation tube 88 and valve 154. During forward flow of gases from crankcase 144 into intake manifold 44, crankcase vapors may not flow through reverse flow orifice 158.

Reverse flow may occur during boosted conditions when intake manifold pressure is higher than CIP. Herein, boosted air from intake manifold 44 may flow through reverse flow orifice 158 along reverse flow path 148 and through crankcase ventilation tube 88, past oil separator 86 towards crankcase 144. Further, during reverse flow, boosted air may not flow through valve 154. As the boosted air is intentionally allowed into the crankcase via the reverse flow orifice 158, positive crankcase ventilation may occur during boosted conditions of the engine. However, allowing flow of boosted air into the crankcase also contributes to crankcase pressurization during boosted conditions. Ejector 67 may counteract crankcase pressurization at boost by drawing vapors from the crankcase enabling purging of the crankcase of various gases including humid air and fuel vapors. Condensation of water inside the crankcase may contribute to sludge formation. Thus, by reducing crankcase humidity, sludge formation within the crankcase may also be reduced. As such, the purging of fuel vapors from within the crankcase may also reduce oil dilution (e.g., fuel in oil).

CV valve 28 includes valve 154 arranged in parallel with reverse flow orifice 158. Valve 154, in this schematic representation, may be a continuously variable valve allowing a variation in degree of opening. As such, reverse flow orifice 158 is included in reverse flow path 148 downstream of check valve 152. Reverse flow orifice 158 may be a low flow orifice allowing a significantly smaller flow rate therethrough. Check valve 152 is biased to allow reverse fluid flow in a direction from intake manifold 44 towards crankcase 144 and to block fluid flow from crankcase 144 to intake manifold 44.

It will be noted that CV valve 28 (and valve 154) may not be controlled by controller 12. Instead, CV valve 28 (and valve 154) may be controlled by vacuum level and/or pressure in the intake manifold 44. CV valve 28 further includes check valve 156. Check valve 156 is arranged in crankcase ventilation tube 88, in series with valve 154, to allow the forward flow of crankcase vapors including blow-by gases only from crankcase 144 to intake manifold 44. Check valve 156 blocks air flow from intake manifold 44 to crankcase 144. Valve 154 may be designed to be more restrictive at higher manifold vacuums (e.g., deeper manifold vacuum) and less restrictive at lower manifold vacuums (e.g., shallow vacuum). In other words, valve 154 may allow a higher flow rate therethrough when shallow vacuum levels are present in the intake manifold 44. Further, valve 154 may allow a smaller flow rate therethrough when the intake manifold 44 has a deeper vacuum. By limiting the flow rate through valve 154 at higher intake manifold vacuum levels, such as vacuum levels occurring during idle conditions, a significantly lower desired engine air flow rate may be obtained.

In one example, valve 154 may include an internal restrictor (e.g., a cone or ball), and/or may be a spring-actuated valve. The position of the internal restrictor and thus the flow through the valve may be regulated by the pressure differential between the intake manifold and the crankcase. For example, when there is no vacuum in the intake manifold, such as during engine off conditions, a spring may keep a base of the internal restrictor seated against an end of a housing of the valve which communicates with the crankcase, such that the valve is in a fully closed position. In contrast, when there is a higher level of vacuum (e.g., deeper vacuum) in the intake manifold, such as under engine idle or deceleration conditions, the internal restrictor moves upward within the valve housing towards the intake manifold end of the valve housing due to the increase in intake manifold vacuum. At this time, valve 154 is substantially closed, and crankcase vapors move through a small annular opening between the internal restrictor and the valve housing.

When intake manifold vacuum is at a lower level (e.g., shallow vacuum such as 15-50 kPa), for example during part-throttle operation, the internal restrictor moves closer to the crankcase end of the valve housing, and CV flow moves through a larger annular opening between the internal restrictor and the valve housing. At this time, valve 154 is partially open. Schematically, this may be represented by a progressive opening of valve 154 and an increase in CV flow.

Finally, a further decrease in intake manifold vacuum (e.g., 0-15 kPa), for example during higher load conditions, moves the internal restrictor even closer to the crankcase end of the valve housing, such that CV flow moves through an even larger annular opening between the internal restrictor and the valve housing. At this time, valve 154 is considered to be fully open, such that CV flow through the valve is maximized. In this way, the opening state of valve 154 is influenced by manifold vacuum, and the flow rate through valve 154 increases as pressure drop across the valve 154 decreases.

Reverse flow orifice 158 may, in one example, be formed as a lengthwise orifice through the length of the internal restrictor allowing a fixed amount of fluid flow to be metered through the CV valve 28 even when the CV valve is fully closed. The reverse flow orifice may be enabled as a purposeful or deliberate leak in CV valve 28 such that during boosted engine conditions when the pressure in the intake manifold is higher than barometric pressure (and/or CIP), the reverse flow orifice extending through the length of the cone may meter a smaller quantity of fresh boosted air from the intake manifold towards the crankcase enabling conduit 82 to function as a fresh air path. To elaborate, blow-by gases exiting crankcase 144 towards intake chamber 42 via conduit 82 during boosted conditions may now be combined with a smaller quantity of fresh boosted air received from intake manifold 44 via the reverse flow orifice 158 of the CV valve 28.

Thus, during boosted conditions, when intake manifold pressure (as measured by MAP sensor 124) is higher than CIP and boost pressure is higher than CIP, a nominal quantity of boosted air may flow from intake manifold 44 through CV tube 88, along reverse flow path 148 and reverse flow orifice 158, into crankcase 144. Crankcase vapors including blow-by gases may then exit crankcase 144 via oil separator 84 through conduit 82 towards junction 85 and thereon into intake chamber 42. These crankcase vapors flowing through conduit 82 towards junction 85 may also include the nominal quantity of boosted air from intake manifold 44 received in the crankcase via reverse flow orifice 158 of CV valve 28. Vacuum generated at the aspirator 22 may draw crankcase gases from crankcase 144 via conduit 82 towards junction 85 and thereon along suction conduit 69 towards suction port 67 of ejector 22. Herein, crankcase gases may mix with compressed air flowing in from first passage 52 of compressor bypass passage 65. These mixed gases may be discharged at a lower pressure from motive outlet 68 of aspirator 22 along second passage 54 towards the inlet of compressor 94. Crankcase gases merged with motive air and fresh air may then flow through compressor 94 past intake throttle 62 into intake manifold 44 and into cylinders 30 for combustion.

The mixed gases including crankcase vapors exiting from second passage 54 may merge with fresh air in intake chamber 42 at location 60. As will be noted, location 60 is positioned downstream of air cleaner 33 and downstream of AIS throttle 115. Thus, crankcase vapors flowing via conduit 82 may merge with fresh intake air downstream of air cleaner 33 and upstream of compressor 94 at location 60. Specifically, crankcase gases may exit crankcase 144 from oil separator 84 into conduit 82 and may flow into suction port 67 of aspirator 22 when the aspirator 22 is generating vacuum, such as during boosted conditions when TIP is higher than CIP.

Thus, the crankcase may be ventilated by one of two paths: when MAP<BP (or MAP<CIP), the crankcase gases may be ventilated directly to the intake manifold via CV valve, and when MAP>BP (or MAP>CIP), crankcase gases may be ventilated at first to the compressor inlet via the ejector (or the ejector bypass passage when the ejector is blocked, as will be detailed below) and thereon into the intake manifold.

As such, blow-by gases in the crankcase may be conveyed into the ejector. Humid blow-by gases when exposed to cooler ambient conditions (e.g., during winter) may form frost. For example, frost may be formed within the throat of the ejector which may be a narrow region within the ejector. Further, the throat of the ejector may also be cooler relative to a temperature of the motive flow streaming through the ejector. Accordingly, ice may form within the throat of ejector resulting in plugging and obstructing the motive path of the ejector. As a result, compressor bypass flow through aspirator 22 may be reduced or may not occur (e.g., may be blocked), and the aspirator may be considered degraded. Further still, the aspirator 22 may no longer produce vacuum for crankcase ventilation along conduit 82 and suction conduit 69. Thus, during boosted conditions, boosted air may flow into crankcase 144 from intake manifold 44 via reverse flow orifice 158 but crankcase vapors within the crankcase and boosted air may not be evacuated via conduit 82. It will be noted that during boosted conditions, a higher amount of blow-by gases may be produced in the engine. Consequently, crankcase pressure as measured by sensor 126 may exceed a desirable pressure.

When the aspirator 22 is plugged (e.g., blocked) and compressor bypass flow does not stream through compressor bypass passage 65, the crankcase may be evacuated via aspirator bypass passage 83. Thus, pressure in the crankcase may be relieved reducing the likelihood of over-pressurization of the crankcase. As such, crankcase pressurization may be reduced during conditions when the ejector is degraded.

It will be appreciated that while the above description discloses one example of ejector plugging via ice formation, the ejector may be plugged and/or degraded via other methods.

Thus, when the aspirator 22 is blocked and not generating vacuum during boosted engine operation, crankcase gases may exit crankcase 144 via oil separator 84 into conduit 82 towards junction 85. At junction 85, these crankcase gases (along with boosted air received from intake manifold 44 via CV valve 28) may enter ejector bypass passage 83 and flow through check valve 81 towards intake chamber 42. Specifically, the crankcase gases may merge with fresh air received via intake passage 41 in intake chamber 42 at location 80 downstream of AIS throttle 115 and upstream of compressor 94. To elaborate, when the ejector 22 is plugged, crankcase gases exiting crankcase 144 may not flow through suction conduit 69, through aspirator 22, and second passage 54 of compressor bypass passage 65.

When engine conditions permit, AIS throttle 115 (when present) may also be shifted to a more closed position (e.g., from a more open position) in response to detecting aspirator plugging and the resulting increase in crankcase pressure during boosted conditions. Closing the AIS throttle may generate vacuum in intake chamber 42 by restricting a flow of air into compressor 94. Further, the position of AIS throttle 115 may be controlled (e.g., closed) to draw CV flow from the crankcase via aspirator bypass passage 83 towards location 80. In one example, vacuum generated by throttling intake airflow via closing AIS throttle 115 may be provided to the crankcase and thus, utilized to remove fuel vapors from the crankcase. Hereon, the fuel vapors in the crankcase gases may be conducted to compressor 94 and thereon to intake manifold 44.

It will be appreciated that positive pressure in the crankcase 144 may be reduced even in engine embodiments without an AIS throttle as the ejector bypass passage 83 offers an alternate route for evacuating the crankcase during boosted conditions when the ejector is blocked. As an example, pressure in intake chamber 42 may be lower than crankcase pressure during boosted conditions and this difference in pressure may enable CV flow from the crankcase to the intake chamber.

In this way, by providing an alternate routing for crankcase vapor flow, pressure in the crankcase may be relieved even when the aspirator is degraded and not generating vacuum to draw crankcase gases.

Engine system 100 may include a control system 15 which in turn comprises controller 12, which may be any electronic control system of the engine system or of the vehicle in which the engine system is installed. Controller 12 may be configured to make control decisions based at least partly on input from one or more sensors 16 within the engine system, and may control actuators 51 based on the control decisions. For example, controller 12 may store computer-readable instructions in memory, and actuators 51 may be controlled via execution of the instructions. Example sensors include MAP sensor 124, mass air flow (MAF) sensor (not shown), BP sensor 120, CIP sensor 121, TIP sensor 122, and crankcase pressure sensor 126. Control system 15 with controller 12 may include computer-readable instructions for controlling actuators 51. Example actuators include intake throttle 62, fuel injector 66, wastegate 98, CBV 50, AIS throttle 115, etc. As such, the controller 12 receives signals from the various sensors of FIG. 1 and employs the various actuators of FIG. 1 to adjust engine operation based on the received signals and instructions stored on a memory of the controller.

Thus, an example representation may include a system comprising an engine including an intake manifold, a compressor in an intake passage (or as termed in reference to FIG. 1 as intake chamber 42) supplying compressed air to the intake manifold, an air induction system throttle coupled in the intake passage, a compressor bypass passage coupled across the compressor, an ejector positioned within the compressor bypass passage, the ejector including a suction port (or suction inlet), a crankcase of the engine, a first port of the crankcase fluidically coupled to the intake manifold via a ventilation tube, the ventilation tube including a crankcase ventilation valve, a suction path fluidically coupling a second port of the crankcase to the suction port of the ejector, and a bypass passage, such as ejector bypass passage 83 of FIG. 1, fluidically coupling the second port of the crankcase to the intake passage upstream of the compressor, the bypass passage arranged in a parallel manner to the suction path, and a check valve coupled in the bypass passage, the check valve biased to allow fluid flow from the crankcase towards the intake passage and block fluid flow from the intake passage towards the crankcase.

Turning now to FIG. 2, it depicts an alternate embodiment 200 of engine system 100 and engine 10 of FIG. 1 presented in a schematic manner. Specifically, the difference between embodiment 200 and engine system 100 is that check valve 81 in ejector bypass passage 83 (of FIG. 1) is replaced by an electronically controlled valve 280 in FIG. 2. As such, the rest of the components previously introduced in FIGS. 1 and 6 are the same and numbered similarly in FIG. 2, and not reintroduced.

Embodiment 200 of FIG. 2 includes electronically controlled ejector bypass valve (EBV) 280 in ejector bypass passage 83. EBV 280 may be actively controlled by controller 12 to allow/disallow flow of blow-by vapors from crankcase 144 to bypass (e.g., not flow through) ejector 22. Thus, by adjusting an opening of EBV 280, crankcase ventilation (CV) flow through aspirator bypass passage 83 into intake chamber 42 may be modulated.

EBV 280 may be an electrically actuated valve, and its state may be controlled by controller 12 based on, in one example, aspirator degradation and/or crankcase pressure. Further, EBV 280 may be either a binary valve (e.g., two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be fully open, fully closed, and/or partially opened to varying degrees.

In the depicted example, EBV 280 may be held at fully closed position as a default. Thus, aspirator 22 may enable crankcase de-pressurization during boosted conditions. Controller 12 may be operatively coupled to EBV 280 to actuate EBV 24 to an open position (e.g., fully open, mostly open, etc.) in response to determining ejector degradation, specifically ejector plugging, and higher crankcase pressures during boosted conditions. As an example, the EBV may be adjusted to the fully open position (from a fully closed position) responsive to determining that the ejector 22 is blocked. Thus, vapors from the crankcase 144 may then flow through conduit 82, past junction 85, into ejector bypass passage 83, through EBV 280, and into intake chamber 42 at location 80. Accordingly, crankcase pressure may be reduced. The AIS throttle 115, when present, may also be adjusted to a more closed position (from a more open position) if existing engine conditions allow the change in position. As such, the intake chamber may now experience a vacuum enabling a higher flow rate of crankcase gases through EBV 280.

An advantage provided by an electronically controlled EBV is that both crankcase over-pressurization (e.g., an increase in positive pressure in the crankcase) and crankcase vacuum levels (e.g., increase in negative pressure in the crankcase) may be controlled. During boosted conditions, if ejector 22 is obstructed, the crankcase may over-pressurize. Herein, an opening of the EBV may be increased to relieve positive pressure in the crankcase. On the other hand, when MAP<CIP and the ejector is blocked, vacuum level (or negative pressure) in the crankcase may increase beyond a level that is desired. Herein, opening the EBV may at least partially counteract higher than desired vacuum levels (or a higher negative pressure) in the crankcase.

Thus, an example method for a boosted engine may comprise, during a first condition, generating vacuum at an aspirator positioned in a compressor bypass passage, using the vacuum to draw gases from a crankcase, and reducing a pressure in the crankcase, and during a second condition, reducing the pressure in the crankcase via a bypass passage coupled to an intake passage (or intake chamber 42) and crankcase. Herein, the first condition may include boosted conditions wherein compressed air from downstream of a compressor flows through the aspirator in the compressor bypass passage to generate vacuum at the aspirator, and wherein the second condition may include boosted conditions wherein the aspirator is plugged and compressed air from downstream of the compressor does not flow through the aspirator. The bypass passage may fluidically couple the crankcase to an engine intake passage upstream of the compressor. It will also be noted that the bypass passage bypasses (or circumvents) the aspirator coupled in the compressor bypass passage, and wherein pressure in the crankcase may be reduced by flowing gases from the crankcase through the bypass passage. The bypass passage may also include a check valve positioned to allow flow of gases from the crankcase towards the engine intake passage while blocking fluid flow from the engine intake passage to the crankcase. In another example, the bypass passage may include an electronically controlled valve, wherein the electronically controlled valve may be opened during the second condition.

Turning now to FIG. 3, it presents an example routine 300 illustrating crankcase ventilation flow during different engine conditions. Specifically, the routine describes crankcase ventilation flows during boosted and non-boosted conditions, and also checks for ejector plugging and modifies crankcase ventilation flows, if desired. As such, routine 300 (and routine 400 of FIG. 4) will be described in relation to the systems shown in FIGS. 1 and 2, but it should be understood that similar routines may be used with other systems without departing from the scope of this disclosure. Instructions for carrying out routine 300, as well as routine 400, included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation, according to the routines described below.

At 302, routine 300 estimates and/or measures existing engine conditions. For example, engine conditions such as engine speed, engine load, MAP, CIP, TIP, etc. may be estimated. Next, at 304, routine 300 determines if the engine is operating under boosted conditions. In one example, the engine may be considered to be boosted when MAP is higher than CIP. As an example, the engine may be operating boosted when an operator demands a higher engine torque. In another example, boosted conditions may include operating with a higher boost pressure wherein TIP is higher than CIP.

If it is determined that the engine is not boosted, routine 300 progresses to 306. Herein, the MAP may be determined to be lower than CIP, or MAP may be lower than barometric pressure (BP). Additionally or alternatively, TIP may be equal to BP as well as MAP being lower than CIP and/or BP during non-boosted conditions. As such, the AIS throttle 115 may be operated in a mostly open position allowing substantial intake air flow into compressor 94. Thus, CIP may largely be equivalent to BP. In engines which do not include the AIS throttle, the engine may be operating under non-boosted conditions when the MAP is lower than BP, and/or TIP is equal to BP. As such, pressure in the intake manifold may be lower than barometric pressure (e.g., at vacuum or negative pressure) during non-boosted conditions. This vacuum in the intake manifold may be utilized, at 306, to draw crankcase gases into the intake manifold via the crankcase ventilation (CV) valve. The flow rate of crankcase gases into the intake manifold may be based on the level of intake manifold vacuum, as described earlier. Deeper levels of intake manifold vacuum (e.g. lower than 50 kPa) may provide a lower rate of CV flow while a shallower vacuum (e.g., 0-15 kPa) in the intake manifold may draw a higher rate of CV flow.

Next, at 308, pressure in the crankcase may be relieved by ventilating the crankcase to the intake manifold. Specifically, pressure build (such as positive pressure) in the crankcase due to blow-by gases may be reduced. At 310, routine 300 confirms if the ejector in the compressor bypass passage (CBP) is plugged. The ejector may be plugged due to icing of the ejector which may cause a reduction in compressor bypass flow through the CBP, thereby reducing vacuum generation at the ejector. Plugging of the ejector may be confirmed via readings from the crankcase pressure sensor, e.g. sensor 126 of FIG. 1. As an example, the ejector may be determined to be plugged if output from the crankcase pressure sensor is higher than a threshold. In another example, if output of the crankcase pressure sensor indicates a vacuum, the ejector may be plugged.

If it is determined that the ejector is plugged, routine 300 proceeds to 314 to maintain drawing CV flow into the intake manifold during conditions when the intake manifold vacuum is present (e.g., during the non-boosted conditions). If the ejector is plugged, at 316, negative pressure may increase in the crankcase. As such, a vacuum build-up may occur in the crankcase as the intake manifold vacuum draws crankcase vapors into the intake manifold since air flow from the aspirator to the crankcase via suction conduit 69 and conduit 82 may not occur. Further still, check valve 81 in aspirator bypass passage 83 may also impede flow of air from intake chamber 42 into aspirator bypass passage and thereon into crankcase 144. In the embodiment of FIG. 2, if desired, the electronically controlled valve EBV 280 may be adjusted to open (from closed) to reduce vacuum build in the crankcase. Thus, deeper vacuum levels in the crankcase may be mitigated in the embodiment of FIG. 2 by increasing the opening of the EBV 280. Routine 300 then ends.

If, at 310, it is confirmed that the ejector is not plugged, routine 300 continues to 312, wherein crankcase vapors continue to be drawn into the intake manifold during non-boosted conditions allowing a reduction in pressure (e.g., reduction in positive pressure) in the crankcase. Routine 300 then ends.

Returning to 304, if it is determined that boosted conditions (e.g., MAP>CIP or MAP>BP) exist, routine 300 proceeds to 320 wherein compressor bypass flow may be enabled in the CBP. As such, if CBV 50 is present, the CBV may be opened, from closed position, to allow the flow of compressed air from downstream of the compressor and upstream of the intake throttle into the CBP 65. If the CBV is not included in the CBP, pressure difference between the boost chamber and the intake chamber may drive the flow of compressed air into the CBP. As explained in reference to FIG. 1, compressor bypass flow through the CBP also streams through the ejector coupled in CBP, such as ejector 22, and vacuum may be generated at the aspirator.

Next, at 322, vacuum generated at the aspirator (also termed, aspirator vacuum herein) may be applied from the suction port of the aspirator to the crankcase. By applying this aspirator vacuum to the crankcase, e.g., to second port of crankcase including oil separator 84, crankcase vapors may be drawn into the suction port 67 of the aspirator 22 via the suction path comprising each of conduit 82 and suction conduit 69 in FIG. 1. Crankcase gases drawn from the crankcase during boosted conditions may also include fresh air (e.g., boosted air) received from the intake manifold via reverse flow orifice 158 of FIG. 1. By drawing crankcase gases into the aspirator, and thereon into the inlet of the compressor 94, crankcase pressure may be reduced at 324. Specifically, positive pressure in the crankcase may be relieved. Next at 326, crankcase vapors received at the compressor inlet may be streamed through the compressor and past the intake throttle into the intake manifold for combustion. Routine 300 then proceeds to 328 to determine if the ejector in the compressor bypass passage is plugged. Specifically, routine 400 of FIG. 4 may be activated. Routine 300 then ends.

Figure 4:
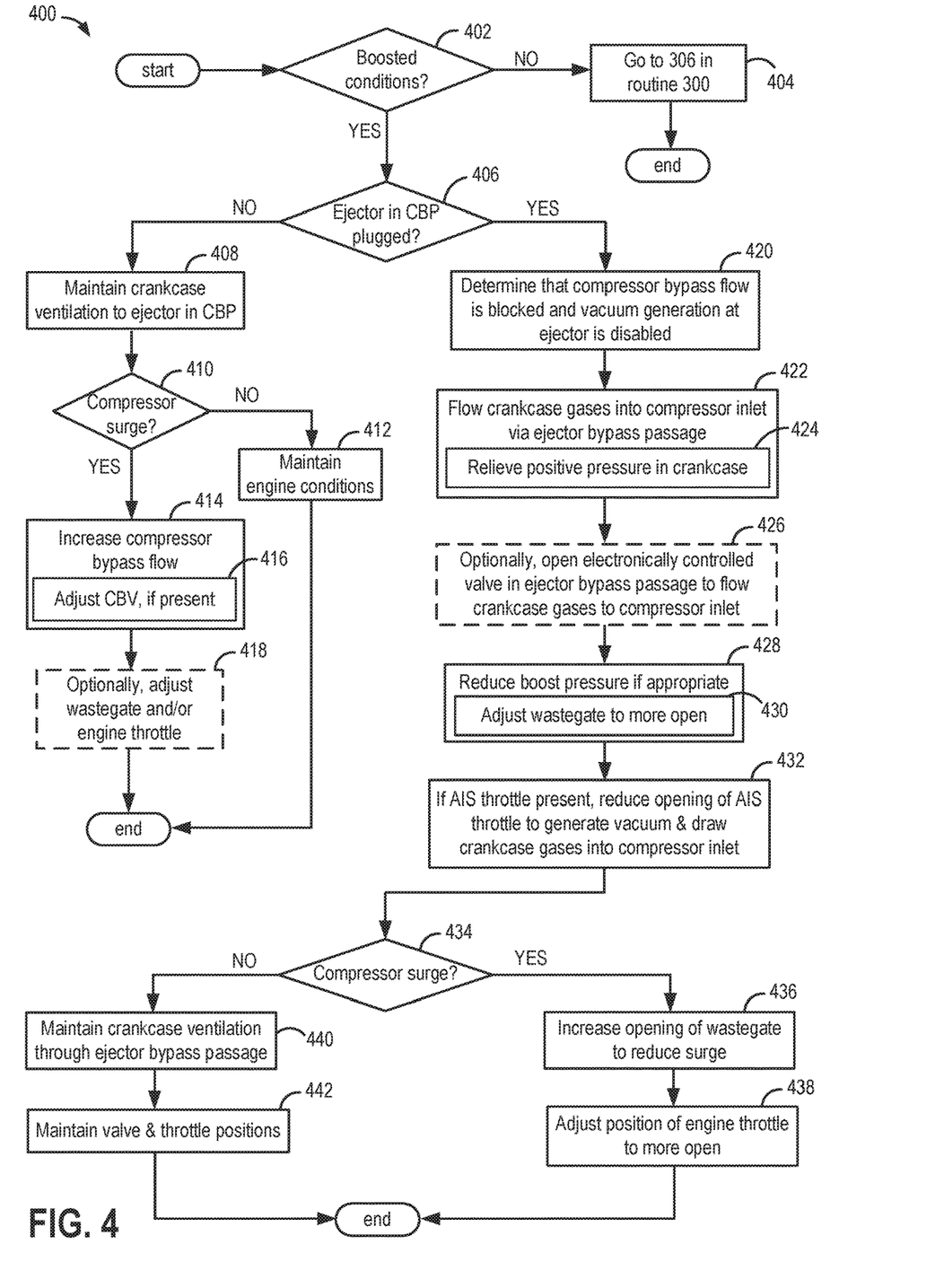
FIG. 4 presents a high level flow chart illustrating crankcase ventilation flow during boosted conditions when an aspirator in the engine system is degraded (e.g., blocked).
Figure 5:
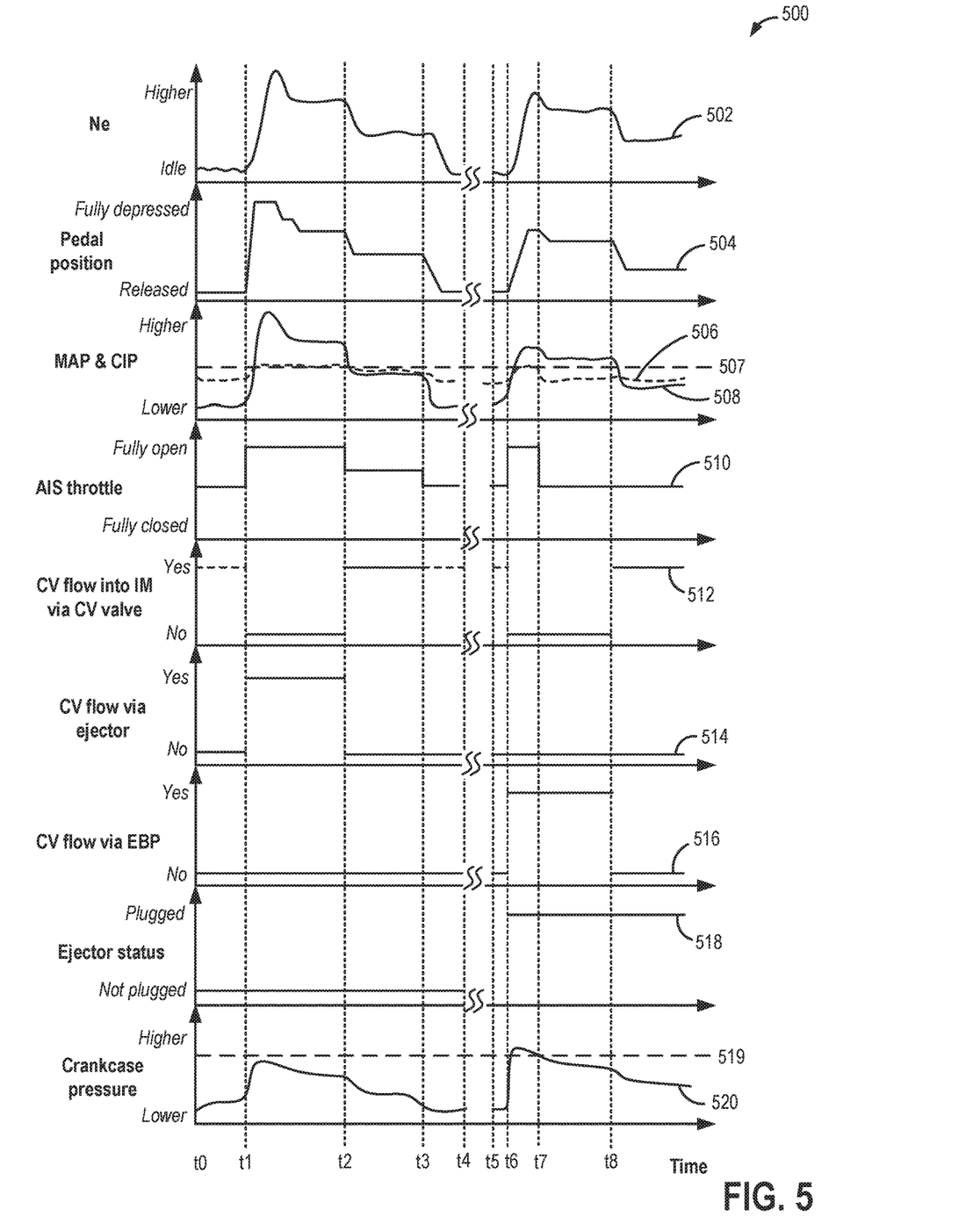
FIG. 5 portrays example flows of crankcase ventilation.

FIG. 4 depicts an example routine 400 for altering crankcase ventilation flow during boosted conditions when the ejector in the compressor bypass passage in plugged. Specifically, the crankcase may be ventilated via the ejector bypass passage if the ejector is plugged. Further, engine parameters may also be modified in response to determining ejector plugging. Routine 400 will be described in relation to the systems shown in FIGS. 1 and 2, but it should be understood that similar routines may be used with other systems without departing from the scope of this disclosure.

At 402, routine 400 confirms that the engine is operating boosted. As mentioned earlier in reference to 304 of routine 300, boosted conditions may be determined based on MAP being higher than BP. If boosted conditions are not confirmed, routine 400 proceeds to 404 to return to 306 in routine 300 of FIG. 3. Further, routine 400 ends. If, however, boosted conditions continue to exist at 402, routine 400 progresses to 406 to determine if the ejector in the CBP is plugged. As explained earlier, pressure readings from the crankcase pressure sensor may be utilized to determine if the ejector is plugged.

If the ejector continues to allow motive flow and produce vacuum (e.g., ejector not plugged), routine 400 continues to 408 to maintain crankcase ventilation flow to the ejector suction port during boosted conditions as described earlier in reference to 322 of routine 300. Next, at 410, routine 400 determines if compressor surge is expected and/or occurring. Compressor surge may occur during transient conditions such as a pedal tip-out when torque demand undergoes a sharp decline. If surge conditions exist, routine 400 continues to 414 to increase compressor bypass flow through the compressor bypass passage to reduce compressor surge. For example, CBV 50, if present, may be adjusted at 416 to a more open position (from a less open position) enabling a higher flow rate of compressed air from downstream of the compressor to upstream of the compressor. Further, as an additional option, at 418, the wastegate may be opened (e.g., to a more open position from a more closed position) to reduce boost levels. Further still, if appropriate, the intake throttle may be adjusted to a more open position from a more closed position to enable a higher air flow into the engine. Routine 400 then ends.

On the other hand, if surge conditions are not detected at 410, routine 400 moves to 412 to maintain existing engine conditions and engine operation. Routine 400 then ends.

Returning to 406, if it is determined that the ejector is plugged, routine 400 continues to 420 to determine that motive flow through the ejector is blocked. Specifically, compressor bypass flow through the CBP and the ejector may be discontinued. Consequently, vacuum may not be generated at the aspirator, and aspirator vacuum production may be disabled. Thus, crankcase ventilation may not flow from the crankcase into the suction port of the aspirator during the existing boosted conditions. Next, at 422, crankcase gases may instead be directed through the aspirator bypass passage, such as ejector bypass passage 83 of FIGS. 1 and 2. Specifically, vapors from the crankcase along with fresh boosted air from the intake manifold may exit the crankcase at the second port (oil separator 84) and enter conduit 82, and at junction 85 may be diverted to ejector bypass passage 83. Herein, crankcase gases may no longer enter suction conduit 69. Further, these vapors from the crankcase may flow through the aspirator bypass passage 83 into the intake chamber and into the inlet of compressor 94. Thus, crankcase vapors may now bypass the aspirator and flow into the compressor inlet. As such, at 424, positive pressure in the crankcase may be relieved by flowing crankcase vapors through the ejector bypass passage.

In the embodiment of FIG. 2 which includes an electronically controlled ejector bypass valve (EBV), such as EBV 280, routine 400 continues to 426 to optionally adjust the EBV to a more open position. In one example, the EBV may be adjusted to a fully open position from a fully closed position. In another example, the EBV may be adjusted to a mostly open position from a mostly closed position. As such, an opening of the EBV may be increased to allow the flow of crankcase vapors from the crankcase to the compressor inlet via the aspirator bypass passage.

Next, at 428, boost pressure may be reduced, if appropriate. For example, boosted conditions may increase crankcase pressure. Therefore, in order to reduce crankcase pressure, boost pressure may be decreased, if engine conditions permit the reduction in boost. In another example, since compressor bypass flow along the compressor bypass passage is reduced (e.g., minimized, or even discontinued due to the blocked aspirator), the engine may be producing a higher amount of boost than desired. Accordingly, to reduce boost pressure, the wastegate may be adjusted to a more open position at 430. Specifically, an opening of the wastegate may be increased to allow a higher amount of exhaust gases to bypass the exhaust turbine along the bypass passage 90 of FIGS. 1 and 2. As such, the wastegate may be shifted to the more open position from a more closed position, in one example.

Next, at 432, if the engine embodiment includes an AIS throttle, and engine conditions permit, the AIS throttle may be adjusted to a more closed position (e.g., from a more open position) to generate a vacuum in the intake chamber. Herein, an opening of the AIS throttle may be reduced to create at least a shallow vacuum upstream of the compressor to draw CV flow through the aspirator bypass passage. For example, the AIS throttle may be adjusted to the more closed position if the demand for boost is lower. In another example, if higher boost is demanded, such as during a tip-in condition, the AIS throttle may not be adjusted to the more closed position in response to the ejector being plugged. Herein, the adjustment of the AIS throttle to the more closed position may be delayed or may not occur until engine conditions permit the change.

Routine 400 then continues to 434 to determine if compressor surge conditions exist. If no, routine 400 progresses to 440 to maintain CV flow through the ejector bypass passage. Further, at 442, existing engine parameters may be maintained. For example, positions of various valves (e.g., wastegate, EBV, etc.) and engine throttle position may be maintained. However, if it is determined at 434 that compressor surge conditions exist, routine 400 proceeds to 436 to further increase the opening of the wastegate. Since compressor bypass flow may be discontinued due to the plugged ejector in the compressor bypass passage, compressor surge may be mitigated by adjusting the wastegate to reduce boost. Specifically, the wastegate may be altered to a more open position. For example, the wastegate may be adjusted to a fully open position from a mostly open position assumed at 430. In another example, the wastegate may be adjusted to the fully open position from a partly open position. Next, at 438, additional actions may be taken to reduce compressor surge. For example, at 438, the engine throttle may be adjusted. For example, the intake throttle may be moved to a more open position. In one example, the intake throttle may be adjusted to a mostly open position from a mostly closed position. In another example, the position of the intake throttle may be modified to a mostly open position from a fully closed position. As such, by increasing the opening of the engine throttle, intake air flow into the engine may be increased and compressor surge may be reduced. Routine 400 then ends.

Thus, crankcase ventilation flow during boosted conditions may continue to occur even though the ejector may be plugged. Further, engine parameters may be adjusted to enhance crankcase ventilation and reduce crankcase pressure. In one example, the wastegate may be opened to a higher degree to reduce boost levels, and crankcase pressure. In another example, the AIS throttle may be adjusted to a more closed position to produce a vacuum at the compressor inlet, if engine conditions permit. The vacuum at the compressor inlet may draw additional crankcase gases into the compressor inlet enabling further reduction in crankcase pressure. Further still, if during these conditions (e.g., boosted and ejector plugged) compressor surge is detected, additional changes may be implemented including adjusting the engine throttle to more open and/or increasing the opening of the wastegate.

In this manner, an example system may comprise an engine, a compressor coupled in an intake passage, a compressor bypass passage coupled across the compressor for flowing compressed air from downstream of the compressor to an inlet of the compressor, an ejector positioned within the compressor bypass passage, the ejector having a suction port, a crankcase, a crankcase pressure sensor coupled to the crankcase, a suction path (e.g., conduit 82 and suction conduit 69 of FIGS. 1 and 2) fluidically coupling the crankcase to the suction port of the ejector, an ejector bypass passage (such as ejector bypass passage 83 of FIGS. 1 and 2) fluidically coupling the crankcase to the inlet of the compressor, the ejector bypass passage bypassing the ejector, an electronically controlled valve (such as EBV 280 of FIG. 2) positioned in the ejector bypass passage, an exhaust turbine coupled in an exhaust passage, a bypass conduit around the exhaust turbine, a wastegate coupled in the bypass conduit, and a controller with computer readable instructions stored in non-transitory memory for, during boosted conditions, applying vacuum generated by the ejector to the crankcase, drawing crankcase gases into the ejector, and relieving pressure in the crankcase, and in response to detecting plugging of the ejector, opening the electronically controlled valve arranged in the ejector bypass passage to relieve pressure in the crankcase, and adjusting the wastegate to reduce boost in the engine, as at 430 in routine 400.

The plugging of the ejector may be detected based on an output of the crankcase pressure sensor. Further, vacuum may be generated by the ejector during boosted conditions due to motive flow through the ejector and the compressor bypass passage, and wherein drawing crankcase gases into the ejector may include drawing crankcase gases through the suction path into the suction port of the ejector. Adjusting the wastegate to reduce boost in the engine may further include increasing an opening of the wastegate to increase flow of exhaust gases through the bypass conduit around the exhaust turbine to reduce boost. The controller may also include instructions for increasing the opening of the wastegate in response to compressor surge. The example system may further comprise an air induction system (AIS) throttle positioned in the intake passage upstream of the compressor. The controller may include further instructions for adjusting the AIS throttle towards a more closed position in response to detecting plugging of the ejector during boosted conditions.

Referring now to FIG. 5, it portrays map 500 depicting example crankcase ventilation (CV) flow during engine operation in a vehicle under various conditions. The vehicle may include an engine comprising an AIS throttle upstream of a compressor, and upstream of a location receiving crankcase ventilation flow from an aspirator bypass passage as shown in the embodiments of FIGS. 1 and 2. As such, map 500 will be described in relation to the systems shown in FIGS. 1 and 2.

Map 500 includes engine speed, Ne, at plot 502, position of an accelerator pedal of the vehicle at plot 504, compressor inlet pressure (CIP) at plot 506 (dashed plot 506), intake manifold pressure as MAP at plot 508 (and not intake manifold vacuum), position of the AIS throttle at plot 510, CV flow into the intake manifold (IM) via the CV valve at plot 512, CV flow into a suction port of the ejector at plot 514, CV flow via the ejector bypass passage (EBP) at plot 516, ejector status at plot 518, and crankcase pressure at plot 520. Ejector status may be one of not plugged wherein the ejector allows fluid flow therethrough, and plugged wherein the ejector obstructs compressor bypass flow as well as suction flow of crankcase gases received from the crankcase. Crankcase pressure may be an output of a crankcase pressure sensor such as sensor 126 of FIGS. 1 and 2. Line 507 represents barometric pressure (BP) and line 519 represents a threshold crankcase pressure. All the above plots are plotted against time, time being plotted along the x-axis. Further, time increases from the left of the x-axis towards the right.

Map 500 includes two drive cycles: a first drive cycle between t0 and t4, and a separate and distinct second drive cycle from t5 through t8. The first drive cycle includes a drive cycle when the ejector in the compressor bypass passage is robust and enables free flow therethrough of compressed air while generating vacuum during boosted conditions to draw crankcase ventilation flow from the crankcase. The second drive cycle includes an example drive cycle when the ejector in the compressor bypass passage is degraded (e.g., plugged) and blocks flow of compressed air therethrough, and therefore, does not generate vacuum to draw crankcase vapors.

Between t0 and t1, the engine may be operating at idle (e.g., non-boosted) as shown by plot 502 for engine speed, and the pedal may be fully released. As such, pressure in the intake manifold may be significantly lower than BP enabling a deep vacuum in the intake manifold. At deep vacuum levels, a smaller CV flow rate may be enabled by the CV valve and a smaller amount of CV flow may stream directly into the intake manifold as indicated by the dashed portion of plot 512. The dashed portion of plot 502 indicates a smaller flow rate of CV flow. The AIS throttle may be half open allowing a reduced flow of air into the intake chamber. Accordingly, CIP may be slightly lower than BP (plot 506). Further, prior to t1, there may be no CV flow into the suction port of the ejector (plot 514) and crankcase pressure, as indicated by the crankcase pressure sensor, may be lower.

At t1, a tip-in may occur as the accelerator pedal is depressed fully resulting in a higher torque demand. For example, the vehicle may be accelerating to merge with traffic on a highway. The AIS throttle may be adjusted fully open so that CIP is substantially equal to BP, and boost pressure may rise significantly as the turbocharger spools up causing a sharp rise in engine speed. As such, MAP may rise to considerably higher than BP. Between t1 and t2, the pedal position may be released gradually as the engine speed settles down to a slightly lower speed as the vehicle speed increases. MAP may remain higher than BP (and CIP) and during these boosted conditions (when MAP>BP and MAP>CIP), the ejector may generate vacuum as compressor bypass flow may occur. In one example, compressor bypass flow may occur due to the pressure differential between TIP and CIP when a CBV is not present. If the CBV is present, the CBV may be adjusted to a more open position (after tip-in is completed, for example) and compressor bypass flow may be initiated. Vacuum generated at the ejector may draw crankcase ventilation flow into the suction port of the ejector as shown by plot 514 between t1 and t2. During these conditions, CV flow into the IM may not occur. However, a nominal flow of boosted air may enter the crankcase from the IM via the reverse flow orifice 158. Since the ejector is not plugged, CV flow will not flow through the EBP (plot 516). Between t1 and t2, crankcase pressure may rise but remains below the threshold crankcase pressure as crankcase pressure may be reduced by CV flow into the ejector.

At t2, steady state conditions of engine operation may be present as the pedal is depressed to about halfway between depressed and released, and the engine speed is lower during steady state operation. For example, the vehicle may now be cruising on the highway. The AIS throttle may be adjusted to a mostly open position from the fully open position. Thus, an opening of the AIS throttle may be decreased slightly. This position may result in a shallow vacuum upstream of the compressor in the intake chamber. Pressure in the intake manifold may decrease to slightly below BP enabling shallow intake manifold vacuum conditions. MAP may also be lower than CIP as shown by plots 508 and 506, and the engine may not be boosted. Accordingly, CV flow through the ejector may not occur after t2. The shallow vacuum in the intake manifold, on the other hand, enables a higher flow rate of crankcase vapors (shown as a solid line of plot 512) directly into the intake manifold via the CV valve (plot 512) between t2 and t3. In response to the higher flow rate of crankcase vapors, crankcase pressure may also reduce further between t2 and t3.

Steady state engine operation may end at t3 as the pedal is released and engine speed decreases to idle gradually. In one example, the vehicle may be slowing down as it exits the highway towards a traffic light and the engine may decelerate. MAP may decrease further below BP and the AIS throttle may be adjusted to half-open position reducing CIP further. CV flow may also be reduced, and a smaller rate of CV flow may occur through CV valve into the intake manifold between t3 and t4 during engine idle conditions. Since this CV flow is significantly small, dashed lines are depicted at plot 512 between t3 and t4. The first drive cycle may end at t4 during these engine idle conditions. Between t4 and t5, a plurality of drive cycles may occur.

At t5, a new drive cycle may begin where the engine is at idle while the pedal is fully released. A smaller amount of CV flow may occur into the intake manifold via the CV valve at t5 while the intake manifold experiences deep vacuum levels, as described earlier for between t0 and t1. The AIS throttle is held at partly open and a shallow vacuum may be present in the intake chamber upstream of the compressor. At t6, the pedal is depressed resulting in an increase in engine speed. As such, the vehicle may be accelerated and may be boosted as shown by the MAP being higher than BP. These boosted conditions may produce a smaller amount of boost than those at t1. The AIS throttle may be fully opened (from partly open) to enable a higher amount of air flow into the intake, and therefore, CIP may be at BP. Since MAP is greater than BP (and CIP) between t6 and t7, boosted conditions may be present. During these boosted conditions, pressure in the crankcase may also increase. As such, crankcase pressure may rise to higher than the threshold crankcase pressure (line 519) at t6 indicating that the ejector is plugged (plot 518).

Accordingly, if an electronically controlled ejector bypass valve (EBV) is present in the ejector bypass passage, the EBV may be opened to enable CV flow through the ejector bypass passage, as shown by plot 516. If an EBV is not present, differential pressure between the crankcase and the compressor inlet may impel crankcase gases to flow from the crankcase to the compressor inlet (or intake chamber, as CIP may be lower than crankcase pressure) through the ejector bypass passage between t6 and t8 (plot 516). Thus, crankcase vapors may bypass each of the ejector and the compressor bypass passage to flow to the compressor inlet when the ejector is plugged. Accordingly, crankcase pressure (plot 520) may be relieved and crankcase pressure reduces to below the threshold crankcase pressure at t7.

Between t6 and t7, CV flow may occur through the ejector bypass passage as the AIS throttle is maintained at fully open during the higher boost levels desired in the engine. As such, the AIS throttle may not be adjusted from the fully open position at t6 since the engine conditions may not permit a reduction in intake air flow. However, at t7, as the pedal is released and engine speed reduces, the AIS throttle may then be adjusted to a more closed position relative to the fully open position. For example, the AIS throttle may be shifted to a position between fully open and fully closed (e.g., a mostly open position, a partly open position). As such, a lower amount of boost may be desired by the engine between t7 and t8. Since the engine continues to be boosted, albeit at lower boost levels, the AIS throttle may be at adjusted to a mostly open position at t7 from the fully open position between t6 and t7.

Accordingly, between t7 and t8, a shallow level of vacuum may be provided at the compressor inlet by decreasing the opening of the AIS throttle. As shown by plot 506, CIP reduces below BP in response to the AIS throttle being adjusted to the more closed position relative to the fully open position between t6 and t7. Further still, the shallow level of vacuum present at the compressor inlet due to the more closed position of the AIS throttle may draw additional crankcase gases into the compressor inlet via the ejector bypass passage. In response to this drawing of additional crankcase gases, crankcase pressure (plot 520) may reduce further between t7 and t8.

At t8, though, the pedal may be released slightly and engine speed may be reduced as engine operation with a non-boosted condition is initiated. For example, the vehicle may be driven on city streets at lower speeds. Since MAP is significantly lower than BP at t8, CV flow through the ejector bypass passage may be discontinued and CV flow through the CV valve into the intake manifold may be commenced at t8. As such, crankcase pressure may reduce further.

Thus, an example method for a boosted engine may comprise, during a first condition, generating vacuum at an aspirator positioned in a compressor bypass passage, drawing vapors from a crankcase using the vacuum generated at the aspirator, and during a second condition, adjusting an opening of an air induction system (AIS) throttle to generate AIS vacuum, and drawing vapors from the crankcase with the AIS vacuum through an aspirator bypass passage. The first condition may include boosted conditions wherein compressed air from downstream of a compressor flows through the aspirator in the compressor bypass passage to generate vacuum at the aspirator, and wherein the second condition may include boosted conditions wherein the aspirator is plugged and compressed air from downstream of the compressor does not flow through the aspirator. Herein, adjusting the opening of the AIS throttle includes reducing the opening of the AIS throttle, (e.g., when engine conditions permit reduction of opening of the AIS throttle). The AIS throttle may be positioned in an intake passage upstream of the compressor. The aspirator bypass passage may fluidically couple the crankcase to an intake passage downstream of the AIS throttle and upstream of the compressor. The aspirator may be determined to be plugged based on an output of a crankcase pressure sensor. The method may further comprise relieving a positive pressure in the crankcase during each of the first condition and the second condition. The method may also comprise, during non-boosted conditions when a pressure in an intake manifold of the boosted engine is lower than atmospheric pressure, flowing vapors from the crankcase directly to the intake manifold via a crankcase ventilation valve.

In this way, pressure in the crankcase of the boosted engine may be relieved during boosted conditions even when an aspirator in the compressor bypass passage is degraded. By providing an alternate route for evacuating the crankcase during boosted conditions when the ejector is plugged, the crankcase may not be exposed to excessive pressurization. The technical effect of relieving pressure in the crankcase is reducing degradation of crankcase seals that may leak if exposed to higher than desired positive pressure in the crankcase. Accordingly, the crankcase and thereby, the engine may have higher durability and enhanced performance.

In another representation, a method for a boosted engine may comprise, during a first boosted condition, flowing compressed air from downstream of a compressor to upstream of the compressor via an ejector in a compressor bypass passage, generating vacuum at the ejector, and using the vacuum to draw crankcase vapors from a crankcase, and relieving pressure in the crankcase, and during a second boosted condition, discontinuing flowing compressed air from downstream of the compressor to upstream of the compressor via the ejector in the compressor bypass passage, and relieving pressure in the crankcase via flowing crankcase vapors via a bypass passage to a compressor inlet. The bypass passage may bypass the ejector. In one example, the bypass passage may include a check valve allowing fluid flow from the crankcase to the compressor inlet while blocking (e.g., not allowing flow) fluid flow from the compressor inlet to the crankcase. In some examples, the bypass passage may include an electronically controlled valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
during a first condition,
generating vacuum at an aspirator positioned in a compressor bypass passage;
using the vacuum to draw gases from a crankcase; and
reducing a pressure in the crankcase; and
during a second condition,
reducing the pressure in the crankcase by drawing vapors from the crankcase, through an aspirator bypass passage, and into an intake passage.

2. The method of claim 1, wherein the first condition includes boosted conditions wherein compressed air from downstream of a compressor flows through the aspirator in the compressor bypass passage to generate vacuum at the aspirator, and wherein the second condition includes boosted conditions wherein the aspirator is plugged and compressed air from downstream of the compressor does not flow through the aspirator.

3. The method of claim 2, wherein the aspirator bypass passage fluidically couples the crankcase to the intake passage upstream of the compressor.

4. The method of claim 3, wherein the aspirator bypass passage bypasses the aspirator coupled in the compressor bypass passage, and wherein pressure in the crankcase is reduced by flowing gases from the crankcase through the aspirator bypass passage.

5. The method of claim 4, wherein the aspirator bypass passage includes a check valve positioned to allow flow of gases from the crankcase towards the intake passage and block fluid flow from the intake passage to the crankcase.

6. The method of claim 4, wherein the aspirator bypass passage includes an electronically controlled valve, and wherein the electronically controlled valve is opened during the second condition.

7. A method for a boosted engine, comprising:
during a first condition,
generating vacuum at an aspirator positioned in a compressor bypass passage; and
drawing vapors from a crankcase using the vacuum generated at the aspirator; and
during a second condition,
adjusting an opening of an air induction system (AIS) throttle to generate AIS vacuum; and
drawing vapors from the crankcase with the AIS vacuum through an aspirator bypass passage.

8. The method of claim 7, wherein the first condition includes boosted conditions wherein compressed air from downstream of a compressor flows through the aspirator in the compressor bypass passage to generate vacuum at the aspirator, and wherein the second condition includes boosted conditions wherein the aspirator is plugged and compressed air from downstream of the compressor does not flow through the aspirator.

9. The method of claim 8, wherein adjusting the opening of the AIS throttle includes reducing the opening of the AIS throttle, and wherein the AIS throttle is positioned in an intake passage upstream of the compressor.

10. The method of claim 9, wherein the aspirator bypass passage fluidically couples the crankcase to the intake passage downstream of the AIS throttle and upstream of the compressor.

11. The method of claim 8, wherein the aspirator is determined to be plugged based on an output of a crankcase pressure sensor.

12. The method of claim 7, further comprising relieving a positive pressure in the crankcase during each of the first condition and the second condition; and further comprising, during the second condition, adjusting a wastegate to reduce boost in the engine.

13. The method of claim 7, further comprising, during non-boosted conditions when a pressure in an intake manifold of the boosted engine is lower than atmospheric pressure, flowing vapors from the crankcase directly to the intake manifold via a crankcase ventilation valve.

* * * * *